United States Patent
Platt et al.

(10) Patent No.: US 11,637,419 B2
(45) Date of Patent: Apr. 25, 2023

(54) CABLE GLAND COMPRESSION LIMITER

(71) Applicant: EATON INTELLIGENT POWER LIMITED, Dublin (IE)

(72) Inventors: Joseph Edward Platt, Baldwinsville, NY (US); Matthew Thomas Pernot, Kirkville, NY (US); Adam Douglas Ledgerwood, Syracuse, NY (US); Himanshu Gangadhar Khokle, Maharashtra (IN)

(73) Assignee: Eaton Intelligent Power Limited

( * ) Notice: Subject to any disclaimer, the term of this patent is extended or adjusted under 35 U.S.C. 154(b) by 8 days.

(21) Appl. No.: 17/221,366

(22) Filed: Apr. 2, 2021

(65) Prior Publication Data
US 2021/0226436 A1    Jul. 22, 2021

Related U.S. Application Data

(63) Continuation of application No. PCT/EP2019/025325, filed on Sep. 30, 2019, which
(Continued)

(51) Int. Cl.
*H02G 15/02* (2006.01)
*H02G 3/22* (2006.01)

(52) U.S. Cl.
CPC .............. *H02G 15/02* (2013.01); *H02G 3/22* (2013.01)

(58) Field of Classification Search
CPC .................. H02G 15/02; H02G 3/22
(Continued)

(56) References Cited

U.S. PATENT DOCUMENTS

| | | | |
|---|---|---|---|
| 3,567,843 A * | 3/1971 | Collins | H02G 3/0616 285/341 |
| 3,587,033 A | 6/1971 | Brorein et al. | |

(Continued)

FOREIGN PATENT DOCUMENTS

| | | |
|---|---|---|
| AU | 2014274614 A1 | 1/2015 |
| CA | 1 170 734 A | 7/1984 |

(Continued)

OTHER PUBLICATIONS

International Search Report and Written Opinion of the International Searching Authority for International Patent Application No. PCT/EP2019/025325 dated Jan. 24, 2020, 17 pages.
(Continued)

*Primary Examiner* — Timothy J Thompson
*Assistant Examiner* — Michael F McAllister
(74) *Attorney, Agent, or Firm* — Merchant & Gould P.C.

(57) ABSTRACT

A cable gland assembly includes a gland nut defining a longitudinal axis. The gland nut includes an interior wall defining a gland nut opening and the interior wall includes a stop. A bushing is disposed within the gland nut opening proximate the stop. The bushing defines a bushing opening configured to receive a cable therein. A sleeve is moveably disposed within the gland nut opening adjacent the bushing. The cable gland assembly also includes a body defining a body opening configured to receive at least a portion of the cable therein. The body is configured to couple to the gland nut, and upon tightening of the gland nut to the body, the gland nut moves along the longitudinal axis compressing the bushing between the gland nut and the sleeve and around the cable. When the sleeve engages with the stop, further compression of the bushing is restricted.

20 Claims, 8 Drawing Sheets

Related U.S. Application Data is a continuation of application No. 16/150,129, filed on Oct. 2, 2018, now Pat. No. 10,714,922.

(58) Field of Classification Search
USPC .......................................................... 174/653
See application file for complete search history.

(56) References Cited

U.S. PATENT DOCUMENTS

| | | | | |
|---|---|---|---|---|
| 3,739,076 | A | * | 6/1973 | Schwartz ............. H01R 13/648 |
| | | | | 174/75 C |
| 3,833,754 | A | * | 9/1974 | Philibert .................. H01R 4/64 |
| | | | | 174/653 |
| 4,030,741 | A | * | 6/1977 | Fidrych ................ H02G 3/0675 |
| | | | | 174/653 |
| 4,150,250 | A | * | 4/1979 | Lundeberg ............. H02G 3/065 |
| | | | | 403/197 |
| 4,350,840 | A | * | 9/1982 | Michaels ............... H02G 3/065 |
| | | | | 279/107 |
| 4,376,873 | A | | 3/1983 | Lackinger |
| 4,549,038 | A | * | 10/1985 | Masheris ............... H02G 3/065 |
| | | | | 174/653 |
| 4,687,272 | A | * | 8/1987 | Spinner .............. H01R 13/5205 |
| | | | | 439/271 |
| 4,810,832 | A | | 3/1989 | Spinner et al. |
| 5,208,427 | A | | 5/1993 | Couto et al. |
| 5,442,140 | A | | 8/1995 | McGrane |
| 5,933,556 | A | | 8/1999 | Hawkins |
| 6,162,995 | A | | 12/2000 | Bachle et al. |
| 6,354,851 | B1 | | 3/2002 | Bachle |
| 6,537,104 | B1 | | 3/2003 | Hagmann et al. |
| RE38,294 | E | | 11/2003 | Nattel et al. |
| 6,783,394 | B1 | | 8/2004 | Holliday |
| 6,812,406 | B2 | | 11/2004 | Hand |
| 7,183,486 | B2 | | 2/2007 | Pyron et al. |
| 8,692,139 | B2 | * | 4/2014 | Aldrich ................ H02G 15/013 |
| | | | | 174/653 |
| 8,766,109 | B2 | | 7/2014 | Duval et al. |
| 9,343,890 | B2 | | 5/2016 | Pelletier |
| D815,046 | S | | 4/2018 | Blake et al. |
| 10,714,922 | B2 | | 7/2020 | Platt |
| 2011/0120766 | A1 | | 5/2011 | Robb et al. |
| 2012/0312593 | A1 | * | 12/2012 | Aldrich ................ H02G 3/083 |
| | | | | 174/653 |
| 2013/0056264 | A1 | * | 3/2013 | Aldrich ................ H02G 15/013 |
| | | | | 174/665 |
| 2015/0033551 | A1 | * | 2/2015 | Chastain ................ H01R 4/646 |
| | | | | 29/828 |
| 2016/0294173 | A1 | | 10/2016 | Mood et al. |
| 2017/0117692 | A1 | | 4/2017 | Swan |
| 2017/0302063 | A1 | | 10/2017 | Proud |
| 2018/0131170 | A1 | * | 5/2018 | Maass ................ H02G 15/013 |
| 2018/0323599 | A1 | | 11/2018 | Proud |

FOREIGN PATENT DOCUMENTS

| | | |
|---|---|---|
| CA | 2 788 959 A1 | 3/2013 |
| CN | 105020481 A | 11/2015 |
| CN | 207765932 | 8/2018 |
| CN | 207910436 U | 9/2018 |
| DE | 20 2008 018 539 U1 | 8/2015 |
| DE | 10 2008 011 978 B4 | 6/2016 |
| DE | 10 2015 116 284 A1 | 3/2017 |
| EP | 0 587 310 A1 | 3/1994 |
| EP | 1 077 517 B1 | 7/2005 |
| EP | 2 999 070 A1 | 3/2016 |
| EP | 3 346 564 A1 | 7/2018 |
| GB | 2 233 838 A | 1/1991 |
| GB | 2296998 | 7/1996 |
| GB | 2 300 765 A | 11/1996 |
| GB | 2 488 990 A | 9/2012 |
| GB | 2488999 | 9/2012 |
| GB | 2 548 192 A | 9/2017 |
| IT | 8722039 | 9/1987 |
| WO | 2014/108691 A1 | 7/2014 |
| WO | 2014/118098 A1 | 8/2014 |

OTHER PUBLICATIONS

Eaton, "Terminator II TMCX Armored Cable Glands", 2018, Crouse-Hinds, 3 pages, pp. 212-214.

Americas Product Catalog, "TMC2 Aluminum Globally Approved, Hazardous (Classified) Location Cable Gland", Jun. 2018, CMP-Products, 1 pg., p. 14.

Appleton, "TMC2 Connectors for Jacketed Metal Clad Cable", Nov. 2017, Emerson, 1 pg., pp. 632-633.

CMP Products, "TMC2-TMC2X-TC Cable Connectors for MC-HL, TECK and Tray Cable", Jun. 2014, TPC 197, Issue 2, 6 pgs.

CMP Products, "CMP Cable Glands & Accessories", CMP Products Cable Gland Catalogue, Jan. 2017, TPC 200, Issue 2, 184 pgs.

CMP Products, "Installation Instructions for CMP Cable Gland Type TMC2", Jun. 24, 2015, 2 pgs.

PCT International Preliminary Report on Patentability in Application PCT/EP2019/025325 dated Apr. 15, 2021, 15 pages.

First Office Action and English Translation, CN Patent Application No. 201980069361 2 dated Apr. 24, 2022, 31 pages.

First Examination Report, IN Patent Applicaiton No. 202117015072 dated Nov. 4, 2022, 6 pages.

* cited by examiner

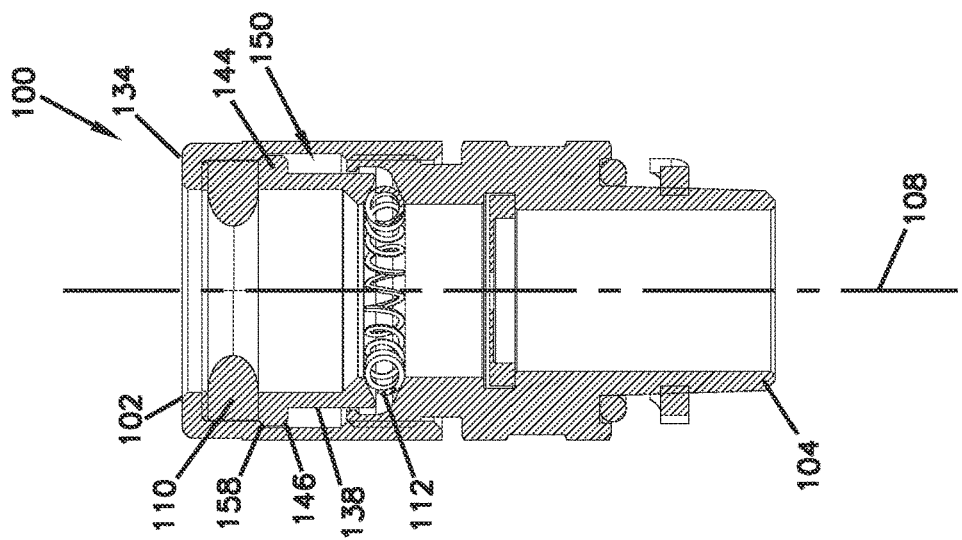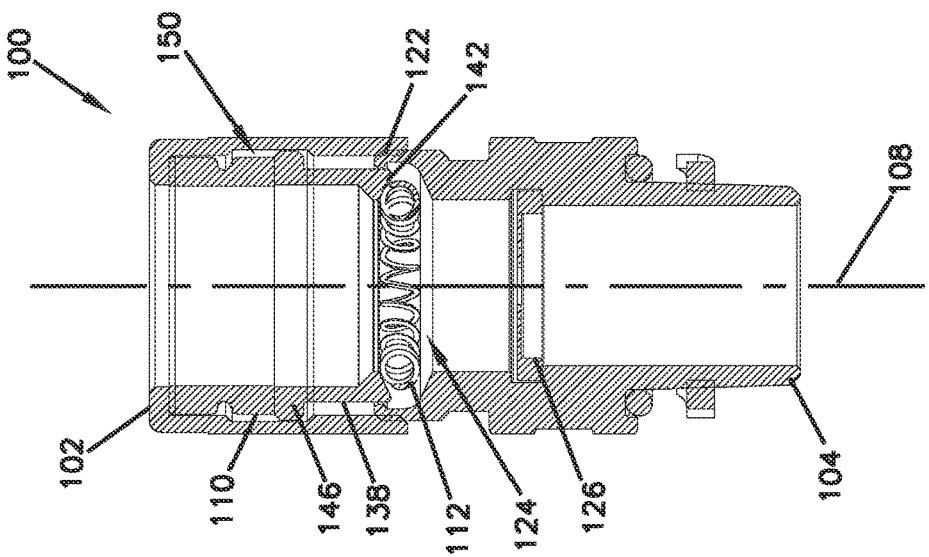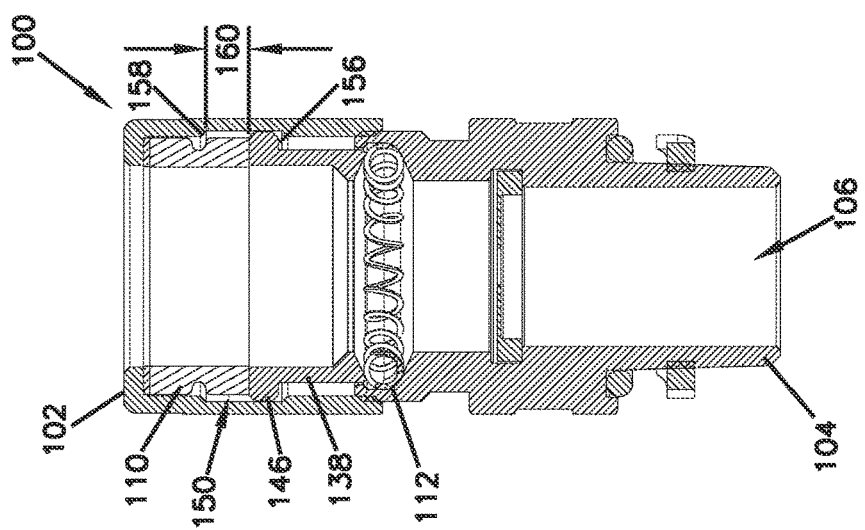

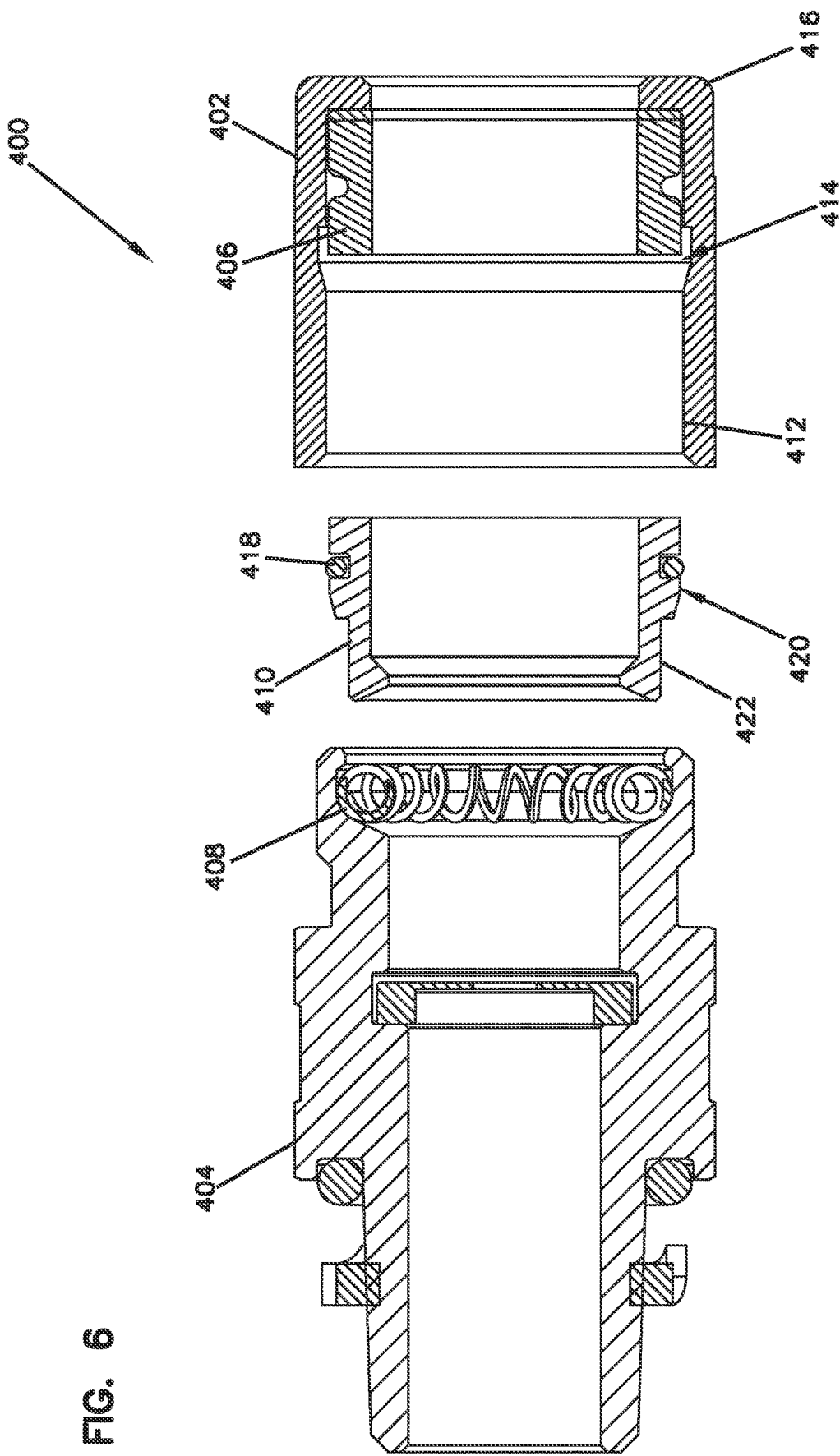

CABLE GLAND COMPRESSION LIMITER

CROSS-REFERENCE TO RELATED APPLICATION

This application is a Continuation of International Patent Application No. PCT/EP2019/025325, filed on Sep. 30, 2019, which is a Continuation of U.S. patent application Ser. No. 16/150,129, now U.S. Pat. No. 10,714,922, filed on Oct. 2, 2018, the disclosures of which are incorporated herein by reference in their entireties. To the extent appropriate, a claim of priority is made to each of the above disclosed applications.

BACKGROUND

The present disclosure relates generally to cable gland connectors, and more specifically, to systems, methods, and devices for limiting the compression of bushings in a cable gland for terminating cable.

Cable gland assemblies are used for terminating cable in hazardous and nonhazardous environments. More specifically, cable gland assemblies generally provide a means for terminating cables, such as unarmored cables (e.g., TC-type) and armored cables, at junction boxes, control centers, panelboards, enclosures, and the like. Typical cable gland assemblies provide a seal around the conductors of the cable, mechanical retention of the cable therein, electrical continuity via the termination of the cable, and protection for the cable. Some known cable gland assemblies are two-piece assemblies in which the assembly has only one body and one nut, and there is only one tightening motion required to secure the cable. When these assemblies are tightened to a required or desired torque (e.g., for use with a tray cable), the sealing bushings may extrude out of the cable gland due to over-compression of the bushing.

SUMMARY

Aspects of the present disclosure relate to a cable gland assembly including: a gland nut defining a longitudinal axis, the gland nut including an interior wall defining a gland nut opening, wherein the interior wall includes a stop; a bushing disposed within the gland nut opening proximate the stop, wherein the bushing defines a bushing opening configured to receive a cable therein; a sleeve moveably disposed at least partially within the gland nut opening adjacent the bushing; and a body defining a body opening configured to receive at least a portion of the cable therein, the body configured to couple to the gland nut, wherein upon tightening of the gland nut to the body, the gland nut moves along the longitudinal axis compressing the bushing between the gland nut and the sleeve and around the cable, and wherein when the sleeve engages with the stop, further compression of the bushing is restricted.

In an example, a grounding mechanism is disposed within the body opening, and after the sleeve engages with the stop, further tightening of the gland nut directs the load through the sleeve and towards the grounding mechanism. In another example, the grounding mechanism includes a spring configured to ground and/or retain the cable. In yet another example, the tightening of the gland nut includes rotating the gland nut relative to the body, and rotating the gland nut compresses both the bushing and the grounding mechanism. In still another example, the sleeve defines a sleeve opening configured to receive the cable therein. In an example, the sleeve includes a collar configured to engage with a step of the stop.

In another example, the collar includes two or more circumferential collar sections, each having different longitudinal lengths, and the step includes two or more circumferential step sections, each having different longitudinal lengths, and wherein the two or more circumferential collar sections correspond to the two or more circumferential step sections. In yet another example, the stop includes a channel radially extending into the interior wall of the gland nut and the sleeve includes a radial collar receivable in the channel. In still another example, a longitudinal distance that the bushing extends over the channel defines a compression limit of the bushing. In an example, the stop includes a recess defined in the interior wall and the sleeve includes a retaining ring, and wherein the retaining ring expands into the recess when the sleeve engages with the stop. In another example, an armor dam is disposed within the body opening.

In yet another example, the sleeve and the bushing are secured within the gland nut opening such that the cable gland assembly is a two-piece design. In still another example, the gland nut is configured to be removable from the body. In an example, the bushing is formed from a silicone-based material.

Another aspect of the present disclosure relates to a cable gland assembly including: a body configured to receive at least a portion of a cable; a grounding mechanism disposed within the body; a gland nut configured to receive at least a portion of the cable and removably couple to the body; a bushing disposed within the gland nut; and a compression limiter, wherein upon tightening of the gland nut to the body, the compression limiter is configured to compress the bushing to a predetermined distance, and wherein when the bushing compression reaches the predetermined distance, the compression limiter directs a resulting force from further tightening of the gland nut towards the grounding mechanism.

In an example, the gland nut defines a longitudinal axis, and the compression limiter includes a sleeve moveably coupled to the gland nut, and wherein relative movement between the sleeve and the gland nut compresses the bushing along the longitudinal axis. In another example, the gland nut includes a stop configured to engage with the sleeve, and the stop at least partially defines the predetermined compression distance of the bushing. In yet another example, when the sleeve engages the stop, the further tightening of the gland nut rotates the gland nut relative to the sleeve. In still another example, the compression limiter is adjustable and includes two or more predetermined compression distances for the bushing.

Another aspect of the present disclosure relates to a cable gland assembly for terminating cable, the cable gland assembly including: a gland nut defining a longitudinal axis, the gland nut including an interior wall defining a gland nut opening, wherein the interior wall including an annular channel; a bushing disposed within the gland nut opening proximate the annular channel, wherein the bushing defines a bushing opening configured to receive a cable therein; a sleeve moveably disposed at least partially within the gland nut opening adjacent the bushing, wherein the sleeve includes a radial collar and defines a sleeve opening configured to receive the cable therein, and wherein the collar is disposed at least partially within the channel; a body defining a body opening configured to receive at least a portion of the cable therein, the body configured to couple to the gland nut; and a grounding mechanism disposed within the body opening, wherein upon tightening of the gland nut to the body, the gland nut moves along the longitudinal axis compressing the bushing between the gland nut and the sleeve and around the cable, and wherein when the collar engages with one end of the channel, further compression of the bushing is restricted and the load is directed towards the grounding mechanism through the sleeve.

A further aspect of the present disclosure relates to a cable gland assembly including: a body configured to receive at least a portion of a cable; a gland nut having an interior wall configured to receive at least a portion of the cable, wherein the gland nut includes: a first end threadably coupled to the body; an opposite second end; and a stop defined on the interior wall between the first end and the second end; a bushing disposed within the gland nut, wherein the bushing is proximate the second end and axially offset from the stop; and a compression limiter movably disposed within the gland nut, wherein the compression limiter includes a collar that upon engagement with the stop defines a compression limit of the bushing.

In an example, at least a portion of the collar is threaded. In another example, a grounding mechanism is disposed within the body. In yet another example, the compression limiter includes a sleeve having a first end configured to engage with the grounding mechanism and a second end configured to engage with the bushing, and the collar is disposed between the first end and the second end of the sleeve. In still another example, an outer diameter of the first end of the sleeve is less than an outer diameter of the second end of the sleeve. In an example, an axial length of the bushing is less than an axial distance of the stop away from the second end of the gland nut.

In another example, the stop comprises a substantially orthogonal step. In yet another example, the compression limiter is movable within the gland nut between at least an uncompressed bushing position and a compressed bushing position, and the compression limiter is positioned adjacent to the stop in both the uncompressed bushing position and the compressed bushing position. In still another example, the interior wall of the gland nut includes a threaded section and a non-threaded section, and the non-threaded section is disposed adjacent to the stop. In an example, the compression limiter is directly adjacent to the bushing within the gland nut.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

FIGS. 3A-3C are cross-sectional views of the cable gland assembly shown in FIG. 1 in three different operating conditions.

FIG. 6 is an exploded cross-sectional view of another cable gland assembly.

DETAILED DESCRIPTION

The cable gland assemblies described herein have features that when tightening the cable gland assembly, limit the compression of a bushing so as to prevent over-compression thereof. At the same time, further tightening of the cable gland is enabled and the resulting compression load is directed towards a grounding mechanism. This produces a cable gland assembly that enables an increased final assembly torque to be reached, such that various construction requirements dictated by appropriate certification standards can be met. Additionally, proper electrical contact between the cable and the grounding mechanism is facilitated without extruding the bushing from a gland nut. These features are enabled while the cable gland assembly maintains a two-piece gland design that uses a single tightening motion to compress both the grounding mechanism and the bushing.

In the below examples, the cable gland assemblies have a compression limiter disposed in the gland nut. This limiter enables the bushing to be compressed to a predetermined distance, and once this distance is reached, further compressive loads are directed towards the grounding mechanism to prevent over-compression of the bushing. By limiting compression loads on the bushing, a broader range of elastomeric materials (e.g., silicone) may be used in the cable gland assembly. For example, high temperature elastomeric materials, such as silicone, generally do not have a high compressive strength, but may be used in the cable gland assemblies described herein because of the compression limiter. This provides a cable gland assembly with a larger operable temperature range and increases its performance.

Many components of the cable gland assembly may be referred to as having generally cylindrically, circular, annular, or conical features, and as having cylindrical or circular holes, cavities, and openings. Such features may be referred to, or defined by, a circumference, radius, external surface, internal surface, and/or other terms appropriate for defining such features. It should be noted that such features may alternatively be elliptical, polygonal, and the like. As used herein, the terms "axial" and "longitudinal" refer to directions and orientations, which extend substantially parallel to a centerline of the cable gland assembly. Moreover, the terms "radial" and "radially" refer to directions and orientations, which extend substantially perpendicular to the centerline of the cable gland assembly. In addition, as used herein, the terms "circumferential" and "circumferentially" refer to directions and orientations, which extend arcuately about the centerline of the cable gland assembly.

Figure 1:
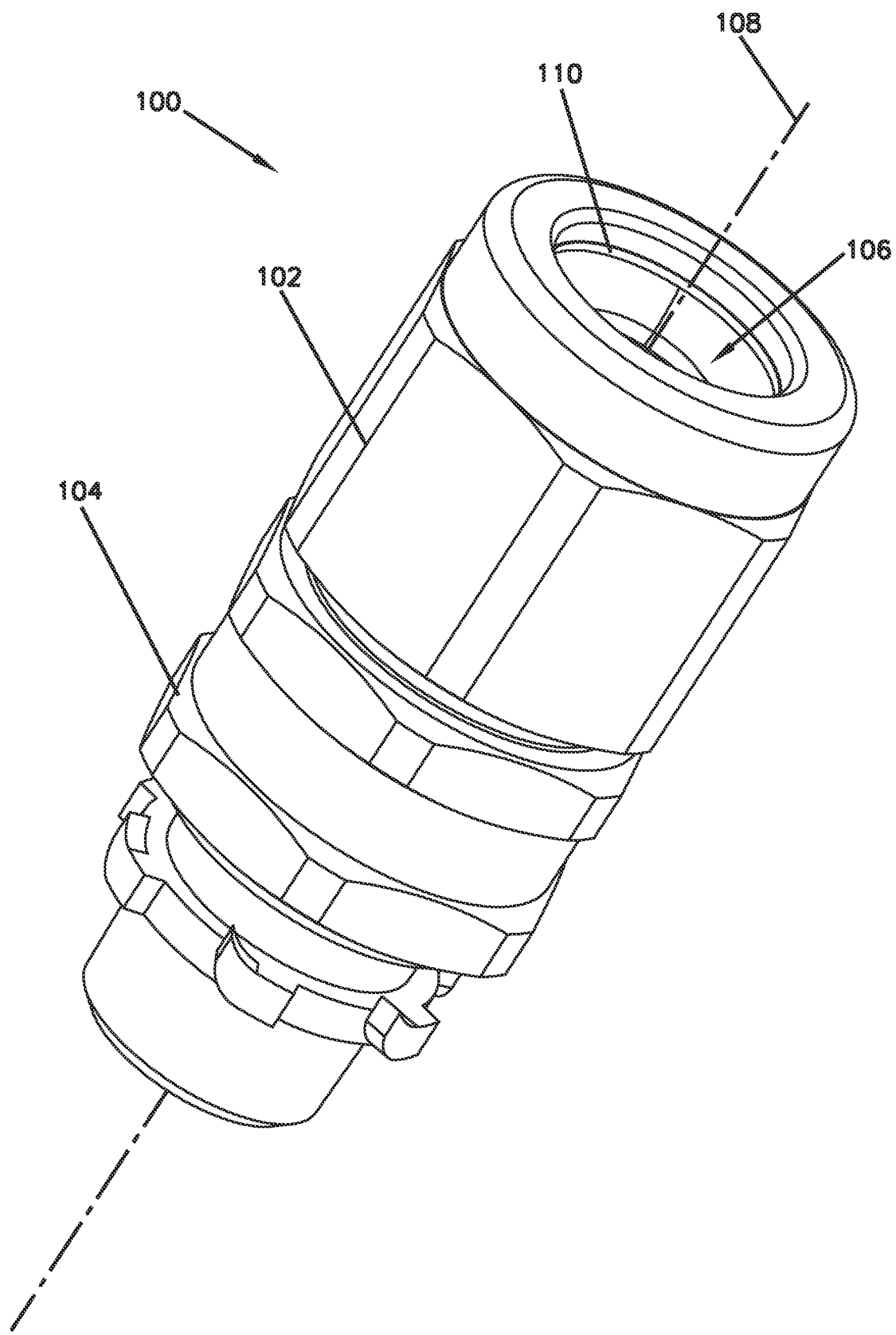
FIG. 1 is a perspective view of an exemplary cable gland assembly.

FIG. 1 is a perspective view of an exemplary cable gland assembly 100. The cable gland assembly 100 includes a gland nut 102 and a hub body 104. The gland nut 102 and the hub body 104 each include a central opening and are coupled together concentrically such that a cable path 106 traverses the cable gland assembly 100 along a longitudinal axis 108. A cable (not shown) may be disposed and/or terminated inside the cable path 106. To retain the cable within the cable gland assembly 100, a bushing 110 is disposed within the gland nut 102 and that is configured to compress around the cable. Additionally, a grounding mechanism 112 (shown in FIG. 2) is disposed within the hub body 104 and which is configured to compress around the cable. As described herein, a cable may be an armored cable that includes an outer jacket layer, an armor layer, and at least one conductor. The cable may alternatively be an unarmored cable that includes an outer jacket layer, an insulation layer, and at least one conductor. It should also be appreciated that the cable gland assembly 100 may be used with any other cable layer configuration that enables the assembly to function as described herein.

In operation, the cable gland assembly 100 is a two-piece design such that the cable may be retained by tightening the gland nut 102 (e.g., rotating about the longitudinal axis 108) about the hub body 104. When the gland nut 102 is first tightened, a torque load is applied to the cable gland assembly 100 and the grounding mechanism 112 axially and radially displaces, and compresses around the cable armor, while the bushing 110 remains relatively uncompressed. Once the grounding mechanism 112 reaches the cable armor (for armored cable types), its compression stops or slows down and at least a portion of the torque load is directed towards the bushing 110. As the torque load is applied to the bushing 110, the bushing 110 is displaced and compresses around the cable jacket. During the compression of the bushing 110, the grounding mechanism 112 may continue to receive some torque load and further compress a small or no amount.

In the example, to reduce or prevent over-compression of the bushing 110, the cable gland assembly 100 includes a compression limiter 114 (shown in FIG. 2) that is configured to limit the amount of torque applied to the bushing 110, and thus, control the compression of the bushing 110. This prevents the bushing 110 from undesirably over-compressing and extruding out of the gland nut 102 when the cable gland assembly 100 is tightened to a required or desired torque. After the compression of the bushing 110 and when the gland nut 102 is further tightened, the compression limiter 114 engages with the gland nut 102 such that further displacement of the bushing 110 is reduced or eliminated. As such, upon further tightening of the gland nut 102, the resulting torque load is directed only to the grounding mechanism 112. This prevents the bushing 110 from over-compressing and extruding out of the gland nut 102, while enabling the cable gland assembly 100 to reach tightening torque values as required or desired. The compression limiter 114 is described in detail further below in reference to FIGS. 2-3C.

The operation of the cable gland assembly 100, in the example, is described as compressing the grounding mechanism 112 first, compressing the bushing 110 second, and then directing the further tightening loads back to the grounding mechanism 112. In other examples, the bushing 110 may compress prior to the grounding mechanism 112. In still other examples, the cable gland assembly 100 may compress the bushing 110 and the grounding mechanism 112 in any order, or any order sequence, as required or desired as long as the compression limiter 114 controls the compression limit of the bushing 110 as described herein.

Figure 2:
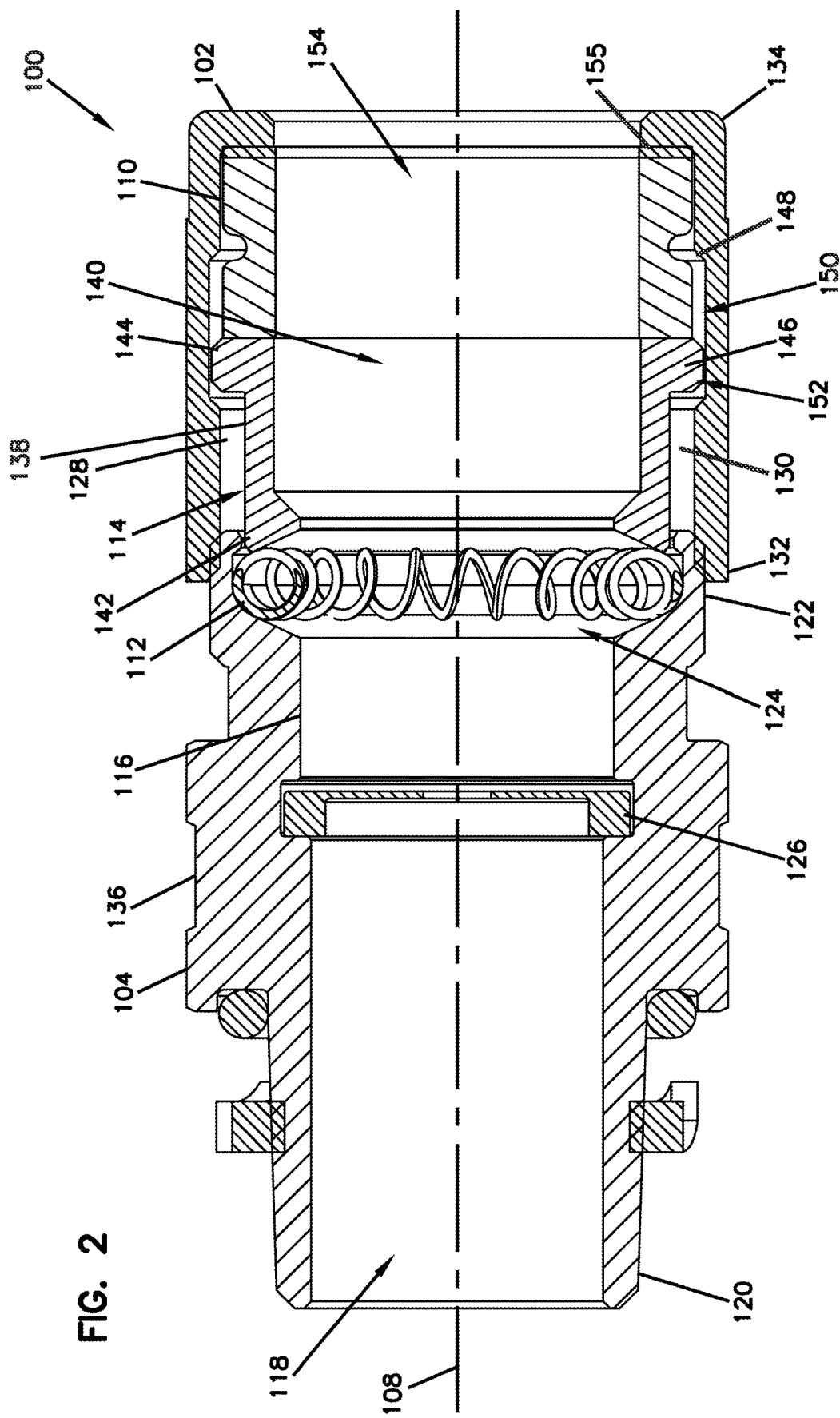
FIG. 2 is a cross-sectional view of the cable gland assembly shown in FIG. 1.

FIG. 2 is a cross-sectional view of the cable gland assembly 100 taken along the longitudinal axis 108. In the example, the hub body 104 includes an interior wall 116 defining a body opening 118 configured to receive at least a portion of the cable. The hub body 104 has a first end 120 that enables the cable gland assembly 100 to be coupled to a cable termination assembly (not shown), such as a junction box, control center, panelboard, enclosure, and the like. An opposite second end 122 of the hub body 104 is coupled to the gland nut 102. At the second end 122, an annular recess 124 is defined within the interior wall 116. The grounding mechanism 112 is at least partially disposed within the recess 124 of the body opening 118 and within the hub body 104. Between the first end 120 and the second end 122 of the hub body 104, the hub body 104 can include a flexible armor stop 126 disposed within the body opening 118. The armor stop 126 includes one or more apertures (not shown) such that the conductor(s) of the cable can extend through the armor stop 126 and out of the first end 120. The armor stop 126 provides a barrier for the armor and the outer jacket of the cable at the second end 122 of the hub body 104. In some examples, the armor stop 126 may be used as a barrier for a sealing compound that may be placed around the conductors(s) towards the first end 120 of the hub body 104.

The gland nut 102 includes an interior wall 128 defining a gland nut opening 130 configured to receive at least a portion of the cable. The gland nut 102 has a first end 132 that couples to the second end 122 of the hub body 104 and an opposite second end 134. In the example, the interior wall 128 has threads at the first end 132 so that the gland nut 102 may threadingly couple to the second end 122 of the hub body 104 via corresponding threads on an outer wall 136 of the hub body 104. By coupling the gland nut 102 to the hub body 104 through a threaded connection, to tighten the gland nut 102 on the hub body 104, the gland nut 102 can be rotated about the longitudinal axis 108 and with respect to the hub body 104. The tightening of the gland nut 102 on the hub body 104 secures the cable within the cable gland assembly 100 and also establishes a ground path through the cable gland assembly 100. Additionally, this connection assembly enables the gland nut 102 to be completely removed from the hub body 104 as required or desired.

In the example, the compression limiter 114 is formed as a sleeve 138 defining a sleeve opening 140 configured to receive the cable therein. The sleeve 138 is moveably disposed within the gland nut opening 130 along the longitudinal axis 108. The sleeve 138 has a first end 142 configured to engage with the grounding mechanism 112. An opposite second end 144 of the sleeve 138 includes a radially extending collar 146 that selectively engages with the interior wall 128 of the gland nut 102. The interior wall 128 of the gland nut 102 includes a stop 148 that when engaged with the collar 146, forms a physical barrier that prevents further axial movement of the sleeve 138 towards the second end 134 of the gland nut 102. That is, the collar 146 engaging with the stop 148 prevents further axial movement of the sleeve 138, but the engagement still enables the gland nut 102 to rotate relative to the sleeve 138 for further nut 102 tightening. This engagement prevents further compression of the bushing 110 as described herein.

The stop 148 may be formed by a channel 150 radially extending into the interior wall 128 of the gland nut 102 and along the longitudinal axis 108. The channel 150 is shaped and sized to receive at least a portion of the collar 146 therein such that the sleeve 138 is secured within the gland nut 102, but can still rotate relative thereto. In some examples, a radially outer wall 152 of the collar 146 may include threads such that the sleeve 138 can be threaded into the first end 132 of the gland nut 102. However, the channel 150 need not to include any threads so that the collar 146 can freely float within the channel 150 and along the longitudinal axis 108. In other examples, the radially outer wall 152 of the collar 146 may include one or more keys (not shown) such that corresponding slots (not shown) on the first end 132 of the gland nut 102 can be used to slide sleeve 138 at least partially into the channel 150. In still other examples, the channel 150 may include a plurality of axially spaced channels connected by one or more slots so that the collar 146 with one or more keys can selectively slide into the axially spaced channels and the compression limit of the bushing 110 is adjustable.

The sleeve 138 is positioned adjacent to the bushing 110. The bushing 110 is disposed within the gland nut opening 130 proximate the stop 148 of the gland nut 102 and defines a bushing opening 154 configured to receive the cable therein. In operation, the bushing 110 compresses between the second end 144 of the sleeve 138 and the gland nut 102, and around the cable. This compression around the cable provides a retaining force on the cable to prevenient cable pull out and to enable a secure cable gland assembly 100 and cable connection. Additionally, the bushing 110 facilitates a watertight seal on the outer jacket of the cable to reduce or prevent water penetration into the cable gland assembly 100. In the example, a slip washer 155 may be disposed between the bushing 110 and the second end 134 of the gland nut 102. The slip washer 155 is configured to enable the gland nut 102 to rotate relative to the bushing 110 so that the bushing 110 does not buckle during rotation of the gland nut 102. In other examples, grease may be used to reduce or prevent bucking of the bushing 110.

In the example, the bushing 110 may be formed from a broad range of elastomeric materials (e.g., silicone) that enables the cable gland assembly 100 to be used in a wide variety of temperature ranges. In an aspect, the elastomeric material may enable the cable gland assembly 100 to be used in temperatures between −60° C. and 110° C. In other aspects, the elastomeric material may be used in temperatures of −25° C. and below, in temperatures of −40° C. and below, or in temperatures of −60° C. and below. In further aspects, the elastomeric material may be used in temperatures of 40° C. and above, in temperatures of 60° C. and above, or in temperatures of 110° C. and above. Additionally, the compression limiter 114 restricts or prevents the bushing 110 from being over-compressed and extruding out of the second end 134 of the gland nut 102, because the sleeve 138 does not longitudinally move past the stop 148.

FIGS. 3A-3C are cross-sectional views of the cable gland assembly 100 in three different operating conditions. Beginning with FIG. 3A, the cable gland assembly 100 is illustrated in its uncompressed condition and prior to cable insertion into the cable path 106. In this condition, the gland nut 102 is coupled to the hub body 104, but there is no compression in either of the bushing 110 or the grounding mechanism 112. Additionally, the collar 146 of the sleeve 138 is positioned adjacent to a first longitudinal end 156 of the channel 150 and the bushing 110 extends away from a second longitudinal end 158 of the channel 150. The longitudinal distance 160 that the bushing 110 extends from the second end 158 of the channel 150 defines the compression limit of the bushing 110 because the collar 146 can only travel between the first end 156 and the second end 158 of the channel 150 and stops at the second end 158.

Turning now to FIG. 3B, the cable gland assembly 100 is illustrated in its first compressed condition where only the grounding mechanism 112 is compressed. As the gland nut 102 is first rotated about the longitudinal axis 108 and tightened to the hub body 104, the rotation of the gland nut 102 moves the gland nut 102, and thus the sleeve 138 and the bushing 110, closer towards the second end 122 of the hub body 104. This longitudinal movement of the sleeve 138 compresses the grounding mechanism 112 around the cable (not shown for clarity) via the shape of the second end 122 of the hub body 104 and the first end 142 of the sleeve 138. Additionally, the bushing 110 remains relatively uncompressed due to its compressive strength and maintains the position of the collar 146 of the sleeve 138 within the channel 150 of the gland nut 102. In this first compressed condition, the gland nut 102 moves the sleeve 138 such that the grounding mechanism 112 axially displaces and radially contracts around the cable. This compression provides a retaining force on the cable to prevenient cable pull out and to enable a secure cable gland assembly 100 and cable connection. In the example, the grounding mechanism 112 is an annular spring disposed between the sleeve 138 and the hub body 104 and within the recess 124 at the second end 122 of the hub body 104. In other examples, the grounding mechanism 112 may be formed from any other type of grounding element other than a spring that enables the cable gland assembly 100 to function as described herein.

Additionally, the grounding mechanism 112 being compressed around the cable armor grounds the cable gland assembly 100 to the cable when an armored cable is used. Generally, when the cable is fully disposed in the cable gland assembly 100, the cable is configured such that the outer layer passes through the gland nut 102, but stops before the grounding mechanism 112. Thus, the armor layer is exposed and disposed through the grounding mechanism 112, but stops proximate the armor stop 126. As such, compression of the grounding mechanism 112 ensures that the grounding mechanism 112 establishes a conductive contact with the armor layer and provides a grounding path for the armor layer.

Once the compressive strength of the bushing 110 is overcome by the tightening of the gland nut 102, the bushing 110 is compressed between the second end 144 of the sleeve 138 and the second end 134 of the gland nut 102 as illustrated in FIG. 3C. FIG. 3C shows a second compressed condition where both the grounding mechanism 112 and the bushing 110 are compressed. This compresses the bushing 110 around the cable (not shown for clarity) to provide a retention force and a watertight seal. However, over-compression of the bushing 110 is restricted or prevented through the interaction between the sleeve 138 and the gland nut 102. More specifically, once the compressive strength of the bushing 110 is overcome, the compression of the grounding mechanism 112 slows down or stops and the gland nut 102 moves along the longitudinal axis 108 relative to the sleeve 138. This longitudinal movement enables the collar 146 of the sleeve 138 to slide within the channel 150 and compress the bushing 110. The movement of the sleeve 138 is limited to the longitudinal distance 160 of the bushing 110 (shown in FIG. 3A) so that the amount of compression of the bushing 110 is controllable and the bushing 110 is not over-compressed. During the compression of the bushing 110, the grounding mechanism 112 may continue to compress a small or no amount through movement of the sleeve 138.

When the collar 146 reaches the second end 158 of the channel 150, the sleeve 138 engages with the gland nut 102 and the sleeve 138 is restricted from further axial movement. The engagement also enables the gland nut 102 to rotate relative to the sleeve 138 upon further rotation of the gland nut 102. This engagement restricts or prevents further compression of the bushing 110 and directs any further compressive loads generated by the tightening of the gland nut 102 through the sleeve 138 and towards the grounding mechanism 112. In some examples, the sleeve 138 may at least partially rotate with the gland nut 102, but relative to the bushing 110 so as to reduce or eliminate bucking of the bushing 110. Accordingly, by disposing and securing both of the bushing 110 and the sleeve 138 within the gland nut 102, the cable gland assembly 100 is a two-piece design in which rotating the gland nut 102 compresses both the bushing 110 and the grounding mechanism 112 in the same tightening motion (e.g., rotation about the longitudinal axis 108). In alternative examples, the channel 150 may be formed in the sleeve 138 and the collar 146 may extend from the gland nut 102 as required or desired.

Figure 4:
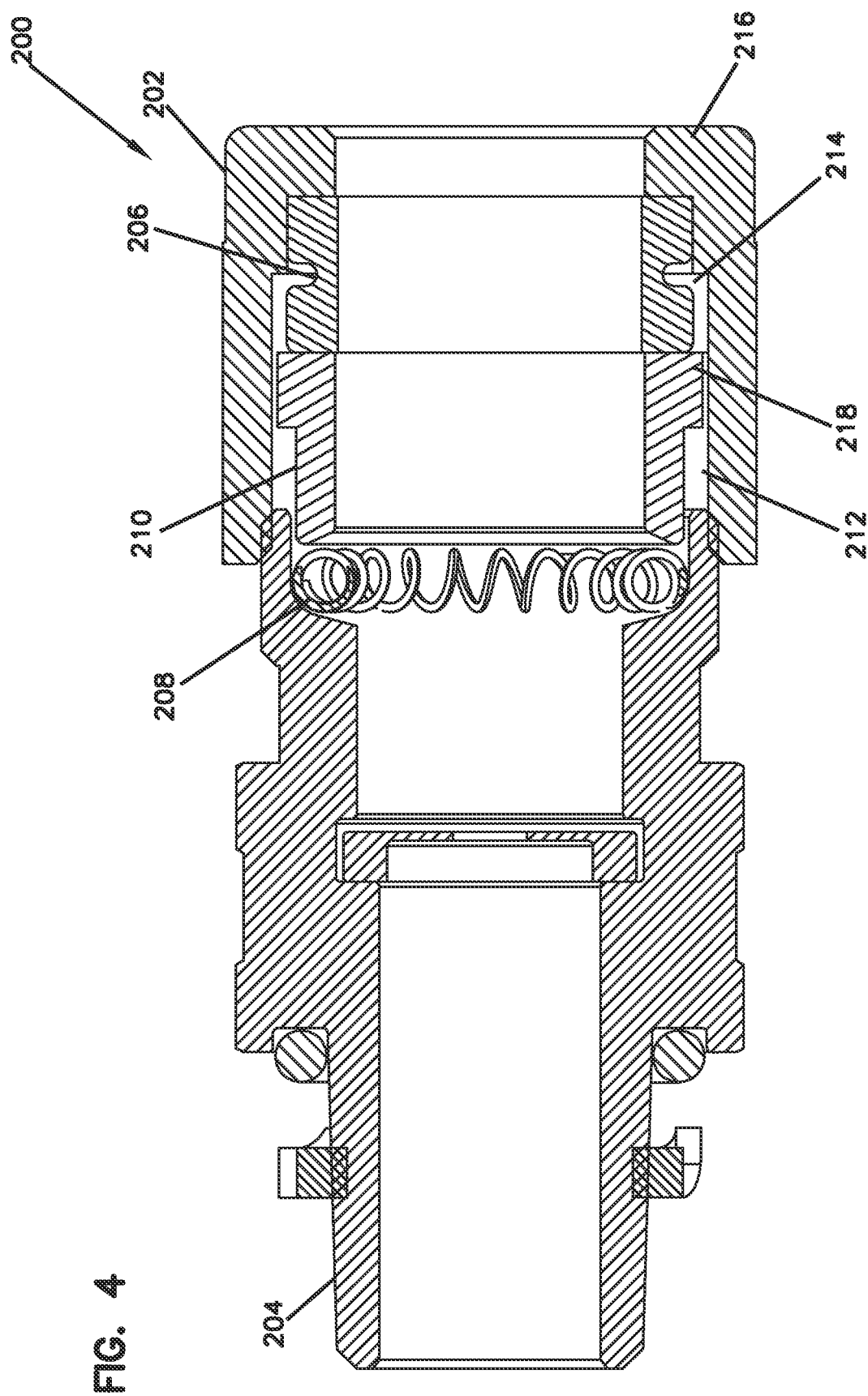
FIG. 4 is a cross-sectional view of another cable gland assembly.

FIG. 4 is a cross-sectional view of another cable gland assembly 200. Similar to the example described above, this example includes a gland nut 202 rotatably coupled to a hub body 204. Additionally, the cable gland assembly 200 includes a bushing 206, a grounding mechanism 208, and a compression limiter 210 that prevents over-compression of the bushing 206 as described above. In this example, however, the compression limiter 210 engages with the gland nut 202 through a different configuration. The gland nut 202 has an interior wall 212 that includes a radially extending step 214 proximate a second end 216 of the gland nut 202. The compression limiter 210 includes a radially extending collar 218 that is configured to engage with the step 214 and restrict axial movement of the compression limiter 210 relative to the gland nut 202. The bushing 206 is disposed proximate the step 214 and extends therefrom in an uncompressed configuration such that longitudinal movement of the gland nut 202 relative to the compression limiter 210 defines the compression limit of the bushing 206.

In this example, the collar 218 may frictionally engage with the interior wall 212 of the gland nut 202 to secure the compression limiter 210 therein. This frictional engagement enables for the gland nut 202 to slide relative to the compression limiter 210 while still facilitating removal of the gland nut 202 from the hub body 204 with the compression limiter 210 coupled thereto. In other examples, the collar 218 may be threadably engaged with the interior wall 212 of the gland nut 202 such that rotational movement of the gland nut 202 corresponds to linear movement of the compression limiter 210. In either example, one or both of the step 214 and the collar 218 may include knurls, ramps, serrations, etc. to further ensure the engagement therebetween when the step 214 contacts with the collar 218 after compression of the bushing 206. In alternative examples, the step 214 may be formed in the compression limiter 210 and the collar 218 may extend from the gland nut 202 as required or desired.

Figure 5B:
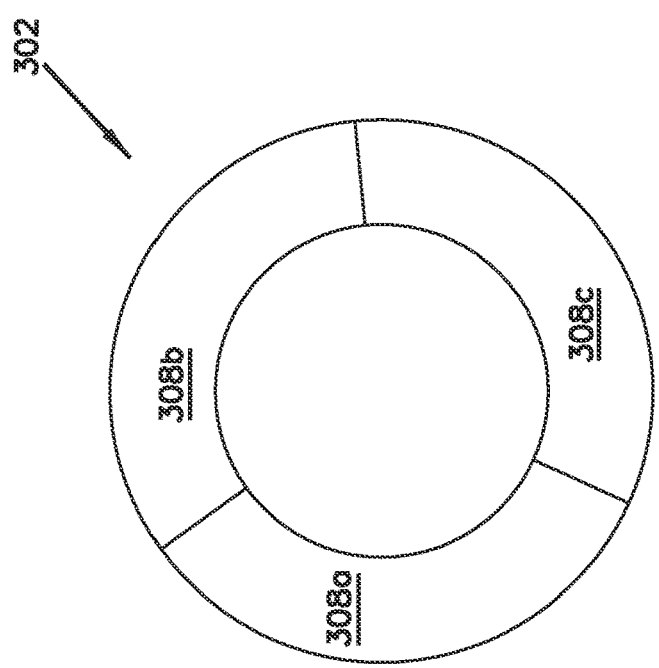
FIG. 5B is a top view of a compression limiter of the cable gland assembly shown in FIG. 5A.
Figure 5A:
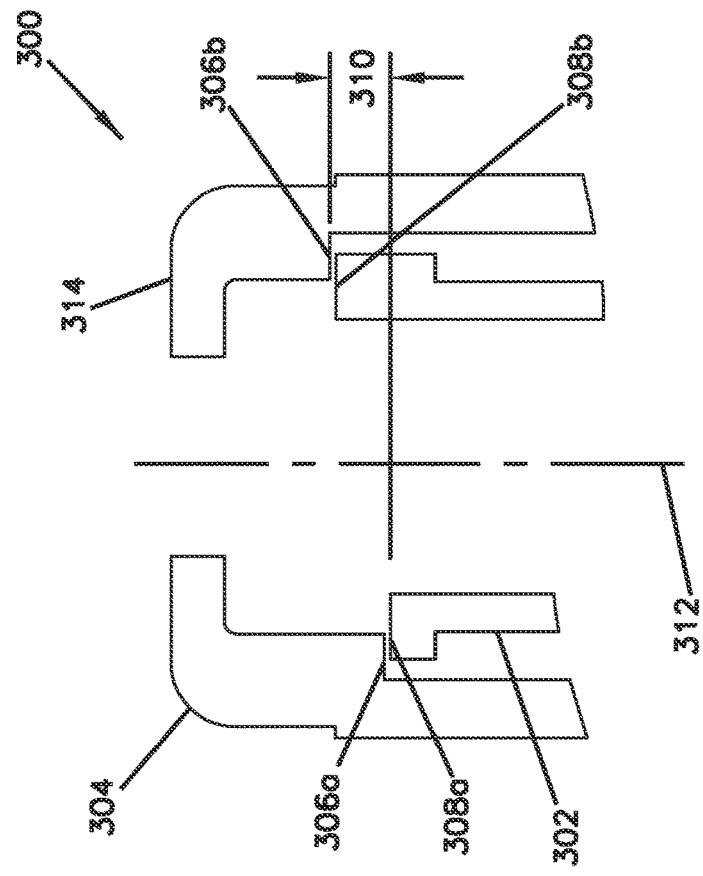
FIG. 5A is a partial cross-sectional view of another cable gland assembly.

FIG. 5A is a partial cross-sectional view of another cable gland assembly 300. FIG. 5B is a top view of a compression limiter 302 of the cable gland assembly 300. Referring concurrently to FIGS. 5A and 5B and similar to the examples described above, this example includes a gland nut 304 that is rotatably coupled to a hub body (not shown) and has a bushing (also not shown). In this example, however, the compression limiter 302 engages with the gland nut 304 through a different configuration. A step 306 of the cable gland assembly 300 includes two or more circumferential step sections 306a, 306b, and 306c (not shown), and a collar 308 of the compression limiter 302 also includes corresponding circumferential collar sections 308a, 308b, and 306c. Each of the circumferential sections of the step 306 and the collar 308 are offset 310 along a longitudinal axis 312 of the cable gland assembly 300.

By splitting the step 306 and the collar 308 into discrete circumferential sections, the engagement between the gland nut 304 and the compression limiter 302 is adjustable. That is, the compression limiter 302 can engage with the gland nut 304 at different locations along the longitudinal axis 312 such that the compression limit of the bushing can vary. This enables larger cable diameters to be accommodated, as they are difficult to secure with a single hard stop. For example, step and collar sections 306a, 308a may be disposed further away from a second end 314 of the gland nut 304, while step and collar sections 306b, 308b are disposed closer, and step and collar sections 306c, 308c are disposed even closer still. Additionally, each section may be offset 310 at an equal distance. In the example, each step and collar section 306 and 308 may be of approximately equal circumferential length. In other examples, the circumferential length of each step and collar section may be different. Additionally, although three step and collar sections are illustrated, it is appreciated that any number of sections (e.g., 2, 4, 5, etc.) may be used as required or desired.

As the gland nut 304 is tightening, the step 306 is moving closer to the collar 308 such that the bushing is compressed therebetween. This movement of the step 306 relative to the collar 308 has the outer most step and collar sections 306a and 308c engage first during the rotation of the gland nut 304. Sometimes this engagement of the step and collar sections 306a and 308c may prevent axial movement of the compression limiter 302 relative to the gland nut 304 because the strength of the bushing prevents further longitudinal displacement. In other occurrences, the compression limiter 302 may axially move further with regards to the gland nut 304 such that step section 306a engages with collar section 308b and step section 306b engages with collar section 308c. Similarly, if needed the compression limiter 302 may axially move even further with regards to the gland nut 304 such step section 306a engages with collar section 308a, step section 306b engages with collar section 308b, and step section 306c engages with collar section 308c. In other examples, the offset distance 310 may vary between each step and collar section. In additional examples, two or more step and collar sections may be engaged substantially simultaneously as required or desired during tightening of the gland nut 304. In alternative examples, the steps 306 may be formed in the compression limiter 302 and the collars 308 may extend from the gland nut 304 as required or desired.

FIG. 6 is an exploded cross-sectional view of another cable gland assembly 400. Similar to the examples described above, this example includes a gland nut 402 rotatably coupled to a hub body 404. Additionally, the cable gland assembly 400 includes a bushing 406, a grounding mechanism 408, and a compression limiter 410 that prevents over-compression of the bushing 406 as described above. In this example, however, the compression limiter 410 engages with the gland nut 402 through a different configuration. The gland nut 402 has an interior wall 412 that includes a radially extending recess 414 proximate a second end 416 of the gland nut 402. The compression limiter 410 includes a radially extending retaining ring 418 that is configured to engage with the recess 414 and form a physical barrier to restrict further axial movement of the compression limiter 410 towards the bushing 406 relative to the gland nut 402. The retaining ring 418 may be disposed within an annular slot 420 defined on an outer wall 422 of the compression limiter 410. The bushing 406 is disposed proximate the recess 414 and extends therefrom in an uncompressed configuration such that longitudinal movement of the gland nut 402 relative to the compression limiter 410 defines the compression limit of the bushing 406.

In this example, the retaining ring 418 is resilient and is at least partially compressed as the compression limiter 410 travels over the threads of the interior wall 412 of the gland nut 402. The ring 418 enables for the gland nut 402 to slide relative to the compression limiter 410 while still facilitating removal of the gland nut 402 from the hub body 404 with the compression limiter 410 coupled thereto. As such, as the gland nut 402 is tightened and moves longitudinally towards the hub body 404 relative to the compression limiter 410, the compression limiter 410 and the ring 418 slide within the gland nut 402. Once a pre-determined gland nut displacement is reached (e.g., based on the location of the recess 414), the ring 418 radially expands into the recess 414 and forms a physical barrier to prevent further axial movement of the compression limiter 410 with respect to the gland nut 402. Additionally, the recess 414 may have a taper on one end such that when the gland nut 402 is removed from the hub body 404, the retaining ring 418 may compress back within the slot 420 as the compression limiter 410 slides within the gland nut 402. However, once the gland nut 402 is removed from the hub body 404, the compression limiter 410 remains secured to the gland nut 402 to maintain the cable gland assembly's two-piece design. In alternative examples, the retaining ring 418 may extend from the gland nut 402 as required or desired.

Figure 7:
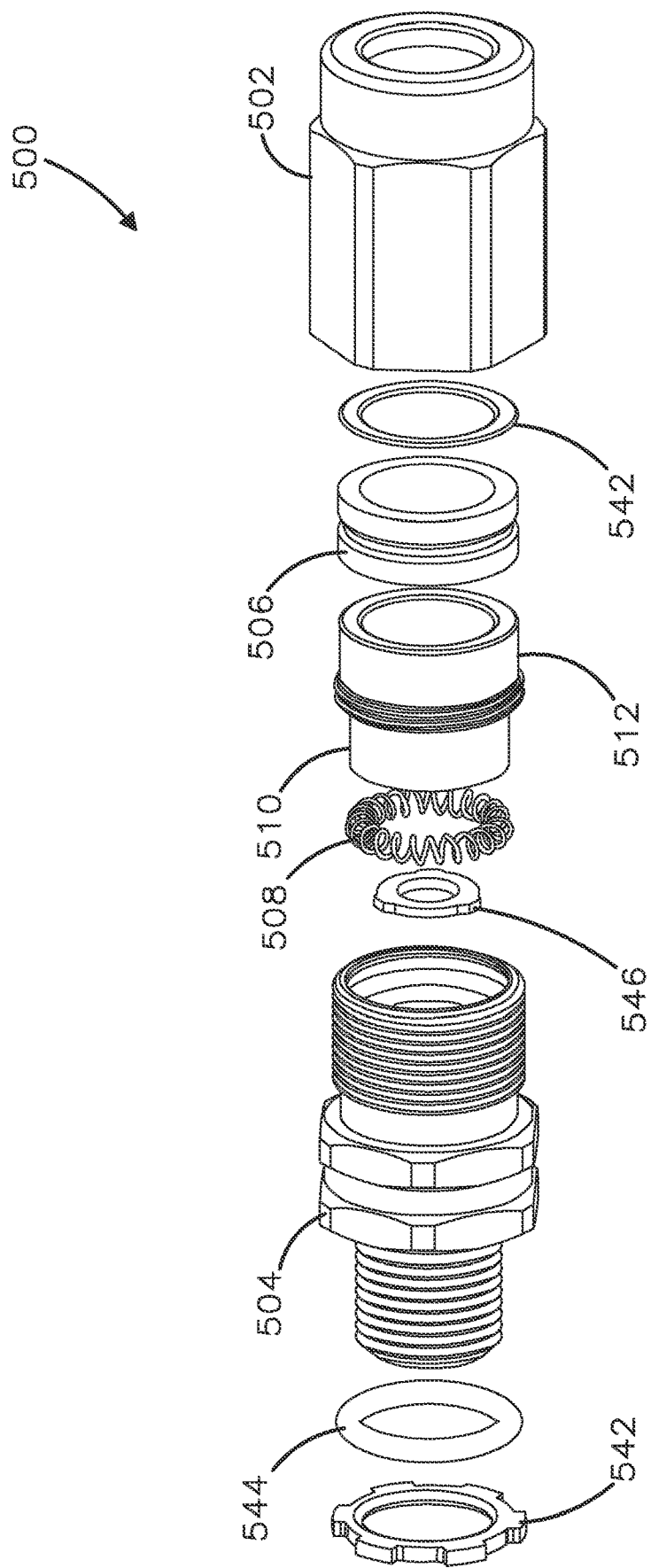
FIG. 7 is an exploded perspective view of another cable gland assembly.
Figure 8:
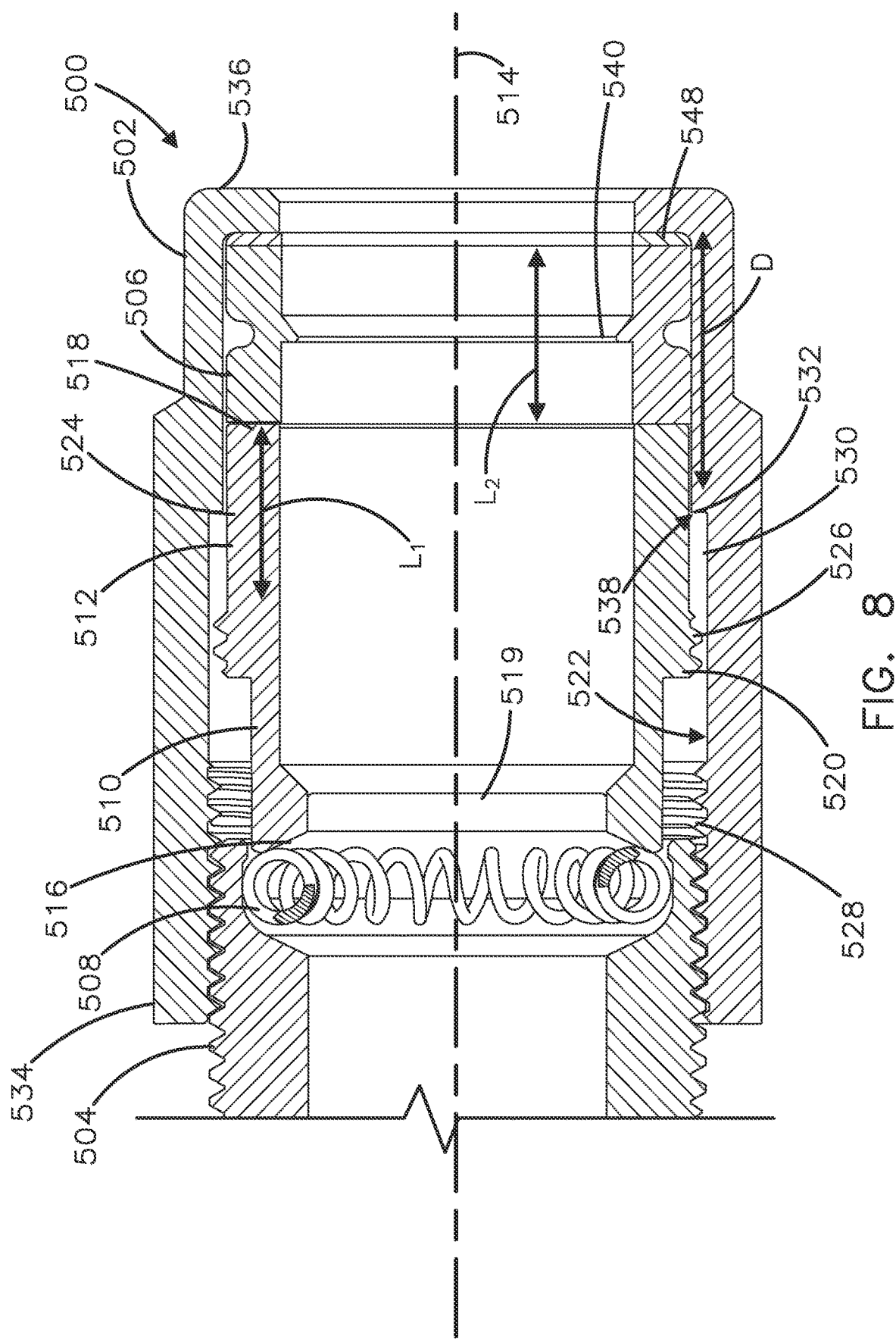
FIG. 8 is a partial cross-sectional view of the cable gland assembly shown in FIG. 7.

FIG. 7 is an exploded perspective view of another cable gland assembly 500. FIG. 8 is a partial cross-sectional view of the cable gland assembly 500. Referring concurrently to FIGS. 7 and 8 and similar to the examples described above, this example includes a gland nut 502 that threadably couples to a hub body 504. Additionally, the cable gland assembly 500 includes a bushing 506, a grounding mechanism 508, and a compression limiter 510 that prevents over-compression of the bushing 506 as described above. In this example, however, the compression limiter 510 engages with the gland nut 502 through a different configuration. The compression limiter 510 is formed as a sleeve 512 that is moveably disposed within the gland nut 502 along a longitudinal axis 514. The sleeve 512 has a first end 516 configured to engage with the grounding mechanism 508 and opposite second end 518 configured to engage with the bushing 506. In an aspect, the first end 516 may have an enlarged (e.g., thicker) shoulder 519 when compared to the examples described above so that the structural strength of the compression limiter 510 is increased. The sleeve 512 also has a radially extending collar 520 that selectively engages with an interior wall 522 of the gland nut 502 so as to define a compression limit of the bushing 506 when the gland nut 502 is tightened on the hub body 504 and to secure the cable therein.

The collar 520 is positioned between the first end 516 and the second end 518 of the sleeve 512 such that the collar 520 is axially offset from the second end 518 and a sleeve extension 524 is formed. The sleeve extension 524 extends in a direction towards the bushing 506 from the collar 520 for an axial length $L_1$. In the example, the collar 520 is externally threaded 526. In an aspect, the collar 520 and the extension 524 may have substantially similar outer diameters, with the threads 526 radially extending from the collar 520 and extending the outer diameter of the collar 520 compared to the sleeve extension 524. In another aspect, the outer diameter of the first end 516 may be less than the outer diameter of the second end 518.

The interior wall 522 of the gland nut 502 includes a threaded section 528, a non-threaded section 530 (e.g., a substantially smooth section and free of threads), and a stop 532. The gland nut 502 has a first end 534 and an opposite second end 536. The threaded section 528 is disposed at the first end 534 of the gland nut 502 so that the nut 502 can be threadably coupled to the hub body 504. The stop 532 is positioned between the first end 543 and the second end 536 of the gland nut 502. The non-threaded section 530 is disposed adjacent to the stop 532 and between the stop 532 and the threaded section 528. The bushing 506 is disposed proximate the second end 536 of the gland nut 502. In an aspect, the second end 518 of the sleeve 512 is positioned directly adjacent to the bushing 506 within the gland nut 502. In the example, the stop 532 has a substantially a flat surface 538 and extends substantially orthogonal to the non-threaded section 530 such that a step is formed.

In the example, the bushing 506 has an axial length $L_2$ that is less than an axial distance D of the position of the stop 532 away from the second end 536 of the gland nut 502. By positioning the bushing 506 axially away and offset from the stop 532, during compression of the bushing 506, the bushing 506 is restricted or prevented from interfering with the compression limiter 510 and gland nut 502 engagement. In some examples, the axial length $L_1$ of the sleeve extension 524 is equal to or greater than the axial length $L_2$ of the bushing 206 so that the sleeve 512 is the component of the cable gland assembly 500 that is adjacent to the stop 532.

During assembly, the compression limiter 510 can be threadingly coupled to the gland nut 502 so as to secure the sleeve 512 and the bushing 506 therein. As such, the cable gland assembly 500 is a two-piece configuration. Once the collar 520 threads through the threaded section 528, the collar 520 is positioned within the non-threaded section 530, and thus, axially moveable relative to the gland nut 502. This configuration of the cable gland assembly 500 is illustrated in FIG. 8 and is an uncompressed bushing position, whereby the bushing 506 is not compressed and the cable gland assembly 500 is configured to receive at least a portion of a cable (not shown) therein.

When the cable gland assembly 500 is securing about a cable, the gland nut 502 is rotated relative to the hub body 504. Upon rotation of the gland nut 502 a compressive force is induced on the grounding mechanism 508 and/or the bushing 506, via the compression limiter 510, as described herein. The compressive force is induced on the bushing 506 until the collar 520 engages with the stop 532 so as to limit over-compression of the bushing 506. This configuration of the cable gland assembly 500 is a compressed bushing position and enables the bushing 506 to seal around the cable without extruding out of the second end 536 of the gland nut 502. In the example, the sleeve 512 is positioned radially adjacent to the stop 532 in both the uncompressed bushing position and the compressed bushing position so that the bushing 506 does not get undesirable caught up in the collar 520 and stop 532 engagement. This increased the performance of the bushing 506 within the cable gland assembly 500.

In the example, the bushing 506 can include a radially inward extending projection 540 so that the efficiency of a seal around a cable is increased. The cable gland assembly 500 can also include a locknut 542 to serve as a positive lock for the assembly 500. A face seal 544 to provide a watertight joint. An armor stop 546 that serves as a cable armor stop, and a washer 548 that is positioned between the bushing 506 and the gland nut 502.

In further examples, the cable gland assemblies may be configured differently than described in the above examples. The described grooves, lips, threads, anti-rotation features, displacement stops, etc., may be replaced with other appropriate mating features that allow the respective components to be appropriate coupled, such as, but not limited to threadably, removably, clampably, slidably coupled, or a combination thereof. Generally, cable gland assemblies including the gland nut, hub body, grounding mechanism, bushing, compression limiter, and armor stop may be made of materials such as, but not limited to, metal, plastic, rubber, ceramic, nylon, silicone, or a combination thereof.

In the examples disclosed herein, the cable gland assemblies provide a robust, two-piece cable gland that is operable over a broad range temperature ranges. The compression limiter of the cable gland assembly enables the grounding mechanism to be compressed without over-comprising the bushing. This facilities a more clearly defined installation procedure for the cable gland assembly so that assembly torques can be prescribed and compression of the grounding mechanism as a last step enables more tactile feedback for the operator. Additionally, because the compression limiter directs torque beyond a predetermined value to the grounding mechanism, the cable gland assembly is more forgiving to over-tightening and prevents the bushing from being extruded out of the gland nut.

This disclosure describes some examples of the present technology with reference to the accompanying drawings, in which only some of the possible examples were shown. Other aspects can, however, be embodied in many different forms and should not be construed as limited to the examples set forth herein. Rather, these examples were provided so that this disclosure was thorough and complete and fully conveyed the scope of the possible examples to those skilled in the art. Any number of the features of the different examples described herein may be combined into one single example and alternate examples having fewer than or more than all of the features herein described are possible. It is to be understood that terminology employed herein is used for the purpose of describing particular examples only and is not intended to be limiting. It must be noted that, as used in this specification, the singular forms "a," "an," and "the" include plural referents unless the context clearly dictates otherwise.

Although specific examples were described herein, the scope of the technology is not limited to those specific examples. One skilled in the art will recognize other examples or improvements that are within the scope of the present technology. Therefore, the specific structure, acts, or media are disclosed only as illustrative examples. Examples according to the technology may also combine elements or components of those that are disclosed in general but not expressly exemplified in combination, unless otherwise stated herein. The scope of the technology is defined by the following claims and any equivalents therein.

What is claimed is:

1. A cable gland assembly comprising:
   a body configured to receive at least a portion of a cable;
   a gland nut having an interior wall configured to receive at least a portion of the cable, wherein the gland nut comprises:
      a first end threadably coupled to the body;
      an opposite second end; and
      a stop defined on the interior wall between the first end and the second end;
   a bushing disposed within the gland nut, wherein the bushing is proximate the second end and axially offset from the stop; and
   a compression limiter movably disposed within the gland nut such that the compression limiter is selectively slidable with respect to the interior wall of the gland nut, wherein the compression limiter comprises a collar that upon engagement with the stop defines a compression limit of the bushing.

2. The cable gland assembly of claim 1, wherein at least a portion of the collar is threaded.

3. The cable gland assembly of claim 1, further comprising a grounding mechanism disposed within the body.

4. The cable gland assembly of claim 3, wherein the compression limiter comprises a sleeve having a first end configured to engage with the grounding mechanism and a second end configured to engage with the bushing, and wherein the collar is disposed between the first end and the second end of the sleeve.

5. The cable gland assembly of claim 4, wherein an outer diameter of the first end of the sleeve is less than an outer diameter of the second end of the sleeve.

6. The cable gland assembly of claim 1, wherein an axial length of the bushing is less than an axial distance of the stop away from the second end of the gland nut.

7. The cable gland assembly of claim 1, wherein the stop comprises a substantially orthogonal step.

8. The cable gland assembly of claim 1, wherein the compression limiter is movable within the gland nut between at least an uncompressed bushing position and a compressed bushing position, and wherein the compression limiter is positioned adjacent to the stop in both the uncompressed bushing position and the compressed bushing position.

9. The cable gland assembly of claim 1, wherein the interior wall of the gland nut comprises a threaded section and a non-threaded section, and wherein the non-threaded section is disposed adjacent to the stop.

10. The cable gland assembly of claim 1, wherein the compression limiter is directly adjacent to the bushing within the gland nut.

11. A cable gland assembly comprising:
    a body configured to receive at least a portion of a cable;
    a grounding mechanism disposed within the body;
    a gland nut configured to receive at least a portion of the cable and removably couple to the body, the gland nut comprising an interior wall having a step;
    a bushing disposed within the gland nut; and
    a compression limiter comprising a sleeve having a collar, the sleeve being selectively slidable with respect to the interior wall of the gland nut, wherein upon tightening of the gland nut to the body, the compression limiter is configured to compress the bushing to a predetermined distance, and wherein when the bushing compression reaches the predetermined distance defined at least partially by the collar of the sleeve engaging with the step of the gland nut, the compression limiter directs a resulting force from further tightening of the gland nut towards the grounding mechanism.

12. The cable gland assembly of claim 11, wherein the sleeve has a first end configured to engage with the grounding mechanism and the first end has an enlarged shoulder.

13. The cable gland assembly of claim 12, wherein the sleeve has an opposite second end configured to engage with the bushing and the second end has an extension such that the collar is axially offset from the second end.

14. The cable gland assembly of claim 13, wherein the extension of the second end defines an axial length, the axial length of the extension being equal to or greater than an axial length of the bushing.

15. The cable gland assembly of claim 13, wherein an outer diameter of the collar is greater than an outer diameter of the extension.

16. The cable gland assembly of claim 11, wherein the bushing comprises a radially inward extending projection.

17. The cable gland assembly of claim 11, further comprising a locknut and a face seal coupled to the body opposite the gland nut.

18. The cable gland assembly of claim 11, wherein the step of the interior wall is formed within a channel radially extending into the interior wall of the gland nut.

19. The cable gland assembly of claim 11, wherein the collar comprises a retaining ring.

20. The cable gland assembly of claim 11, wherein the sleeve and the bushing are secured within the gland nut such that the cable gland assembly is a two-piece design.

* * * * *